United States Patent [19]

Weng

[11] Patent Number: 4,845,980
[45] Date of Patent: Jul. 11, 1989

[54] TIRE PRESSURE GAUGE

[76] Inventor: Hsi-Kuang Weng, No. 35, Sec. 4, Ting Tsao Rd., Lu Kang, Chang Huah, Taiwan

[21] Appl. No.: 238,482

[22] Filed: Aug. 31, 1988

[51] Int. Cl.$^4$ ............................................. B60C 23/02
[52] U.S. Cl. ..................................... 73/146.8; 73/744
[58] Field of Search ................... 73/146.8, 146.3, 744; 137/227, 228, 229

[56] References Cited

U.S. PATENT DOCUMENTS 1,683,343  9/1928  Gartner .............................. 73/146.8

Primary Examiner—Donald O. Woodiel
Attorney, Agent, or Firm—Browdy and Neimark

[57] ABSTRACT

A tyre pressure gauge includes as in the prior art a cylindrical housing securing thereto a tubular member securing thereto a first measuring head, a piston rod, a spiral spring, a sectorial plate capable of being pivoted by the rod, a pinion meshing with the plate, a scale plate, and a needle connected to the pinion wherein the improvement is that the gauge further includes a soft tube having a first end detachably connected to the first measuring head and a second end connected to a second measuring head. Such gauge can conveniently measure the air pressure of inner wheels of a truck or a bus with the second measuring head without the need of bringing the cylindrical housing into the bottom of the bus.

5 Claims, 4 Drawing Sheets

TYRE PRESSURE GAUGE

BACKGROUND OF THE INVENTION

The present invention relates to a tyre pressure gauge, and more particularly to a diversified tyre pressure gauge.

A conventional tyre pressure gauge, as shown in FIG. 1, includes a measuring head 1 having a central projection 2 capable of being urged against an air valve of a tyre for passing an air pressure from the tyre, through a through hole 3 in head 1, into a hollow tubular member 4 to axially slide a piston rod 5 in member 4, a housing 6 pivotally mounting therein a sectorial toothed plate 7 meshing with a pinion 8 securing thereon a needle 9 pointing on a scale plate 10 so that needle 9 will point a scale on plate 10 when toothed plate 7 is pivoted by rod 5, a spiral spring 11 for returning rod 5 to the position not actuated by the air pressure, a pawling plate 12 capable of pawling against pinion 8 in order to maintain needle 9 on a position rotated by toothed plate 7, and a push terminal 13 for releasing pinion 8 from being pawled by pawling plate 12 to return pinion 8 to the position not rotated by toothed plate 7.

Such gauge can easily measure the tyre pressure of a 4-wheeled car but cannot conveniently measure the tyre pressure of a bus or a truck, since a 6 or more wheeled vehicle has a relatively wide tyre and inner wheels the tyre pressure of which cannot be easily measured with the relatively short tubular member 4 as in the case happening to a 4-wheeled car. Up to the present, one must crawl into the bottom (under the chassis) of the vehicle if he wants to effectively and accurately measure the tyre pressure of inner wheels of the vehicle. It is therefore tried by the Applicant to deal with this situation.

SUMMARY OF THE INVENTION

It is therefore an object of the present invention to provide a tyre pressure gauge capable of conveniently measuring the air pressure of any wheel of a four or more wheeled vehicle.

According to the present invention, a tyre pressure gauge includes a cylindrical housing having an open top, a first measuring head capable of being inserted upon an air valve of a tyre for passing therethrough an air pressure from the tyre, a tubular member mounted between the housing and the measuring head, a piston rod actuated by the air pressure, a spiral spring mounted between the housing and the rod for restoring the into into a non-actuated position, a sectorial plate capable of being pivoted by the rod, a vestoring spring mounted between the housing and the sectorial plate for returning the plate into a non-pivoted position, a pinion meshing with the plate, a scale plate covered on the open top, a needle connected to the pinion, and a pawl capable of pawling the pinion in a position rotated by the sectorial plate, wherein the improvement resides in that the gauge further includes a soft tube having a first end detachably connected to the first measuring head and a second end connecting thereto a second measuring head capable of being inserted upon an air valve of an inner wheel of a 6 or more wheeled vehicle without the necessity of bringing the cylindrical casing into the bottom of the vehicle.

Certainly, the second measuring head can include a hollow measuring rod having a first end connected to the second soft tube end and a second end having a central axial projection having an eccentrical axial through hole, and a cylindrical piece coaxially secured to the second measuring rod end and capable of cooperating with the projection to form therebetween an annular space capable of inserting therein a top portion of the air valve. The pawl can be an elastic metal wire.

The present gauge can further include a hollow connector connecting the first measuring head and the first soft tube end.

The first measuring head can include a circular diaphragm coaxially mounted in the tubular member and having an eccentrical through hole capable of passing therethrough the air pressure, and a second central axial projection extended from the diaphragm and capable of cooperating with a wall of the tubular member to form therebetween an annular space. The tubular member, the circular diaphragm and the second projection can be integrally formed.

The present gauge can further include a mounting block fixed to the housing, securing therein an end of the tubular member and protruding therefrom the piston rod in the housing.

The present invention may best be understood through the following description with reference to the accompanying drawings, in which:

DETAILED DESCRIPTION OF THE PREFERRED EMBODIMENT

Figure 1:
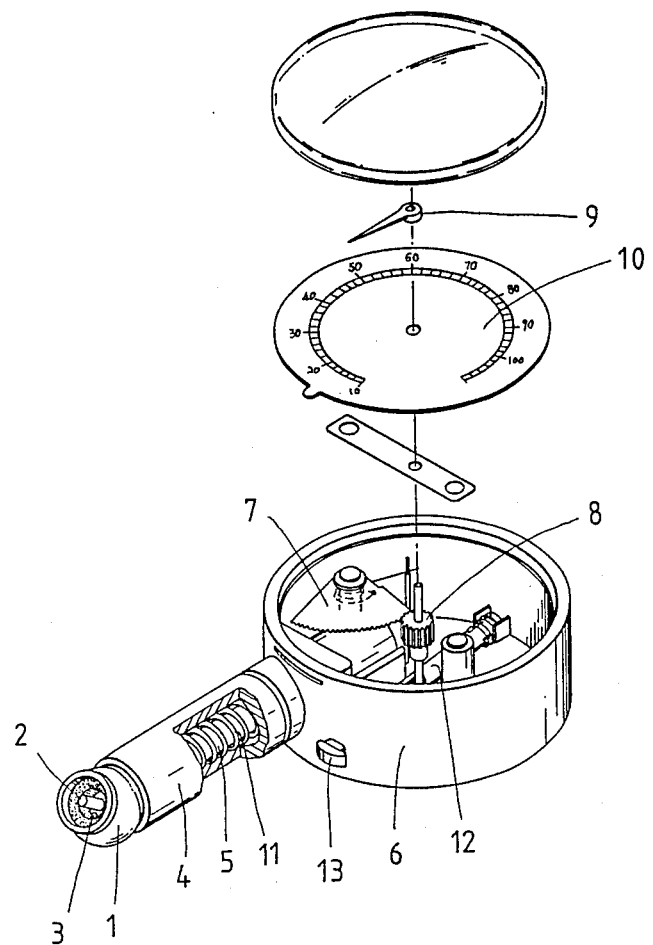
FIG. 1 is a partly exploded view of a tyre pressure gauge according to the prior art.
Figure 2:
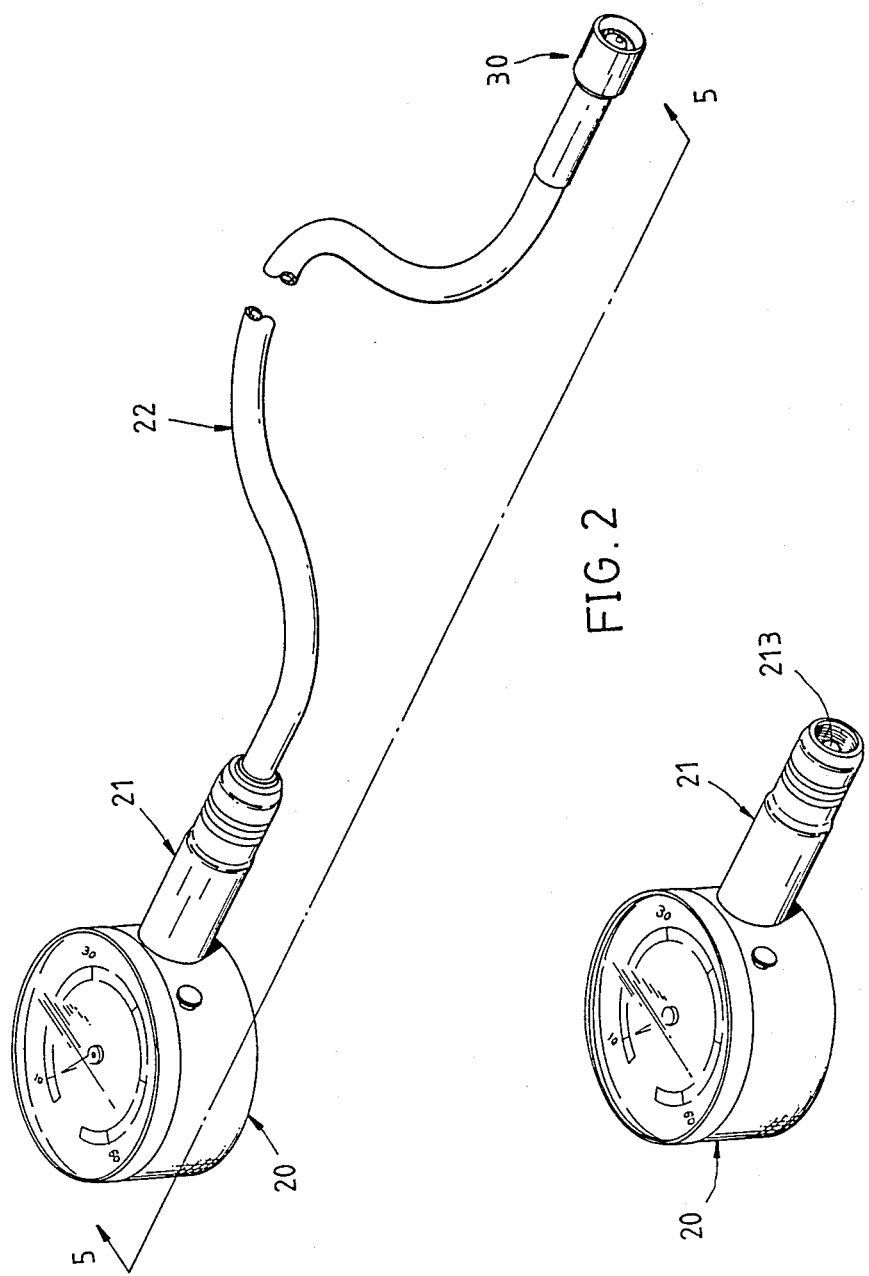
FIG. 2 is a perspective view of a tyre pressure gauge according to the present invention.
Figure 3:
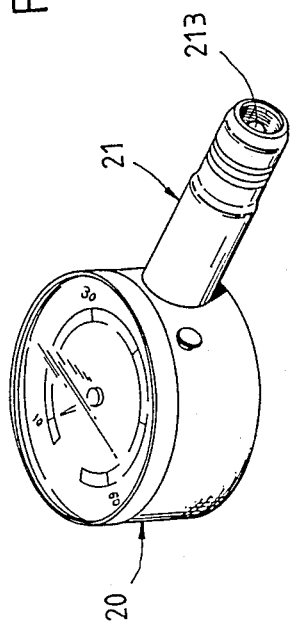
FIG. 3 is a perspective view of a tyre pressure gauge in FIG. 2 with the soft tube removed.
Figure 4:
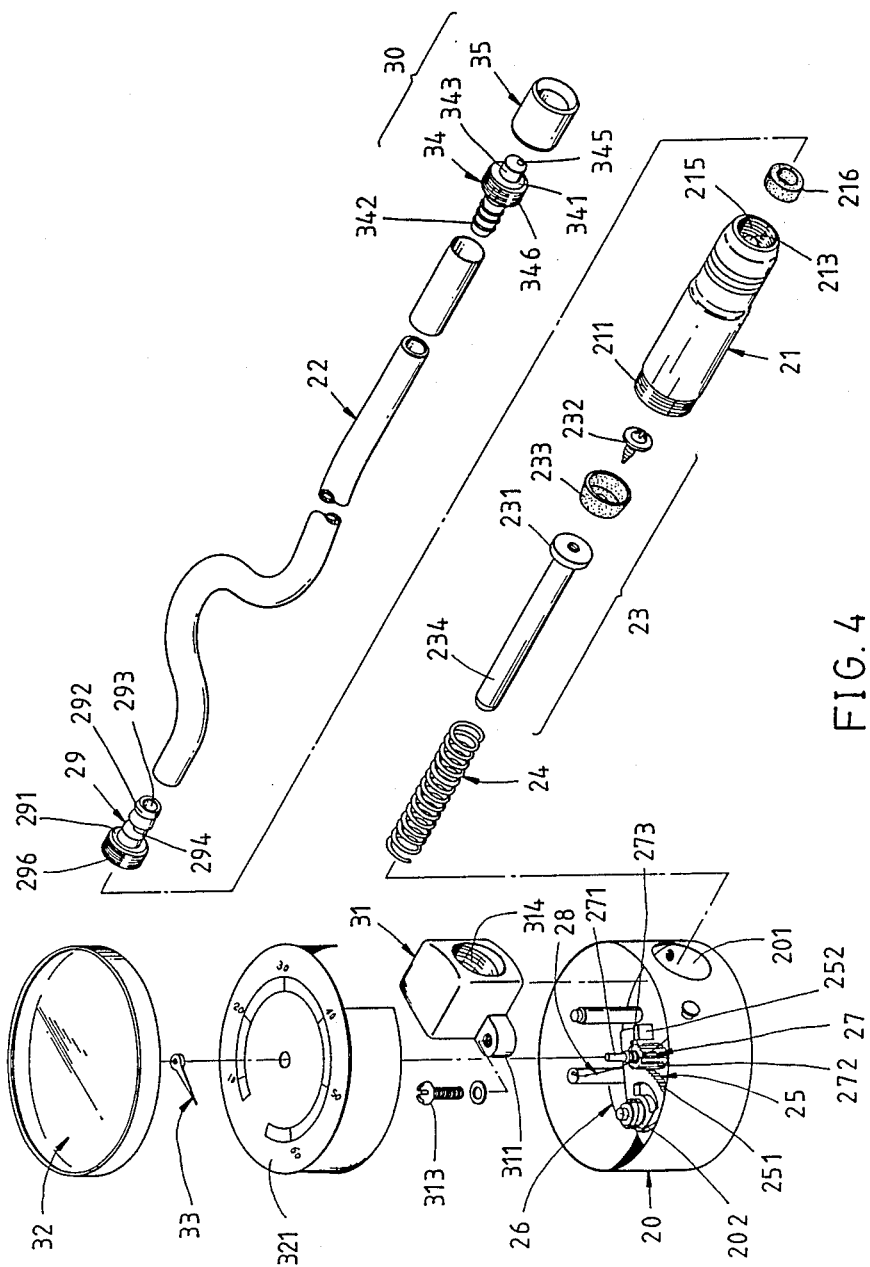
FIG. 4 is an exploded view of a tyre pressure gauge in FIG. 2.
Figure 5:
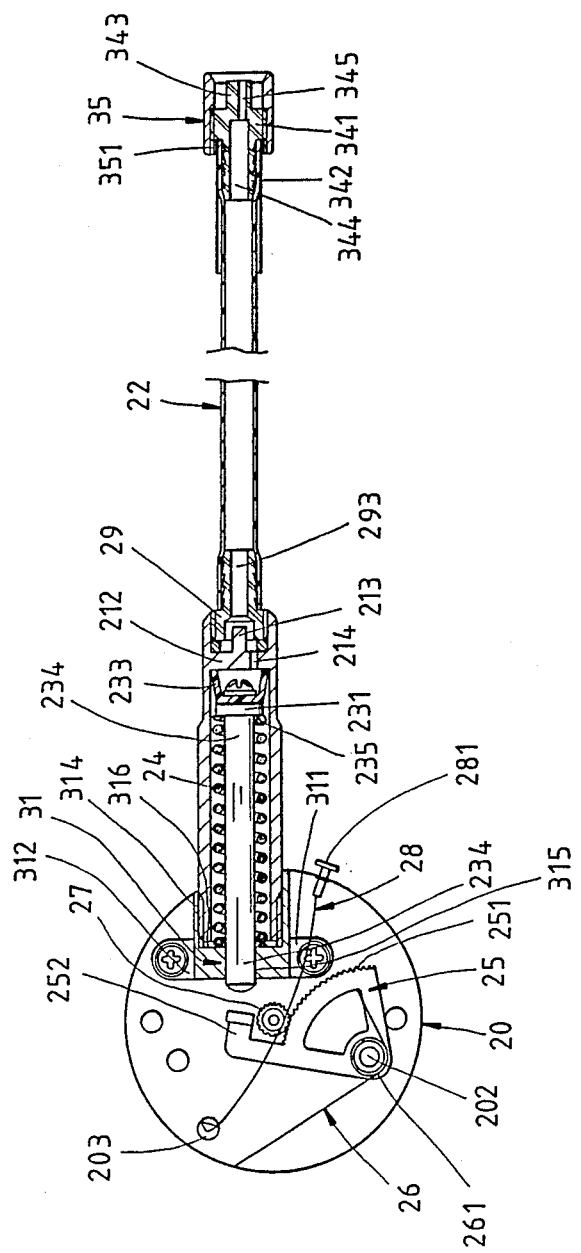
FIG. 5 is a sectional view taken along line 5—5 in FIG. 2.

Referring now to FIGS. 2-5, a tyre pressure gauge according to the present invention includes a cylindrical housing 20 having an open top, a tubular member 21, a soft tube 22, a piston rod 23 and a sprial spring 24 received in member 21, a toothed sectorial plate 25, a restoring spring 26, a pinion 27, a pawling metal wire 28, a hollow connector 29, a measuring head 30, a mounting block 31, a cover 32 and a scale plate 321 covered on the open top of housing 20, and a needle 33 secured to a shaft 271 of pinion 27.

Mounting block 31 having two side lugs 311, 312, by means of bolts 313, secured to housing 20 includes a larger screw hole 314 aligning with a side hole 201 of housing 20 and a smaller hole 315 protruding therefrom piston rod 23 in housing 20.

Tubular member 21 having a threaded end 211 screwed through the hole 201 in hole 314 integrally forms at the opposite end a coaxially mounted circular diaphragm 212 having an eccentrical through hole 214 capable of passing therethrough an air pressure, and on diaphragm 212 a central axial projection 213 capable of cooperating with a threaded wall 215 of the opposite end to form therebetween an annular space capable of inserting therein a top portion of the air valve.

Piston rod 23 has a piston end 231 attaching thereto, by means of a screw 232, a sealing member 233 for being actuated by the air pressure transmitting through through hole 214 to protrude the actuating end 234 beyond hole 315 to actuate sectorial plate 25. Spiral spring 24 sleeved on piston rod 23 is mounted between a shoulder surface 235 of piston end 231 and a shoulder surface 316 of mounting block 31 for always urging sealing member 233 against diaphragm 212 if sealing member 233 is not actuated by an air pressure from a tyre. The annular space formed between wall 215 and projection 213 can insert therein a rubber washer 216 against diaphragm 212.

Connector 29 having a through hole 293 includes a first end 291 having a threaded surface 296 meshing with threaded wall 215 and a second end 292 having a toothed surface 294 engaging with one end of soft tube 22.

Measuring head 30 includes a hollow measuring rod 34 having a toothed end 342 connected to the opposite end of soft tube 22 and an opposite end 341 forming thereon a central axial projection 343 having an eccentrical axial through hole 345 communicating with a hollow center 344 of measuring rod 34, and a cylindrical piece 34 having a threaded surface 351 screwed on a threaded surface 346 of rod end 341.

Sectorial plate 25 is rotatably mounted on a rod 202 fixed to housing 20 and has an arcuate toothed endge 251 meshing with teeth 272 of pinion 27 rotatably mounted in housing and an engaging extension 252 capable of being actuated by actuating end 234. Restoring spring 26 having a central portion 261 wound around rod 202 includes a first end egnaging with a wall of housing 20 and a second end fixed to sectorial plate 25, for restoring plate 25 into a position not pivoted by piston rod 23 if rod 23 no more presses against engaging extension 252. Pawling wire 28 has a first end fixed to a rod 203 secured to housing 20, a second end connected to a push terminal 281, and an intermediate portion engaging with an engaging surface 273 of pinion 27 so that it can pawl pinion 27 in a position rotated by sectorial plate 25 and can release the pawling action on pinion 27 if push terminal 281 is radially pushed with respect to housing 20.

When the present gauge is to measure the tyre pressure of a 4 wheeled car, the annular space formed between projection 213 and wall 215 inserts therein a top portion of the relevant air valve which will pass an air pressure through through hole 214 to axially slide piston rod 23 in tubular member 21 which in turn protrudes actuating end 234 beyond hole 315 to engage with engaging extension 252 for pivoting sectorial plate 25 which in turn rotates pinion 27 and needle 33 pointing on a scale on scale plate 321. Before push terminal 281 is pushed, needle 33 will remain at the rotated position even if tubular member 21 is removed from the air valve. If terminal 281 is pushed, sectorial plate 25 and pinion 27 will return to the non-actuated position through the provision of retoring spring 26.

When the present gauge is to measure for a 6 or more wheeled vehicle, first connector end 291 is screwed in wall 215 and the annular space formed between projection 343 and cylindrical piece 35 is inserted on a top portion of an air valve of the vehicle. Thus, the air pressure from the air valve will transmit through through hole 345, hollow center 344, soft tube 22, through hole 293, and through hole 214 to axially slide piston rod 23 in tubular member 21 as described above.

Through the above description, it should now become readily apparent how and why the present invention can achieve the objects it contemplates.

What I claim is:

1. A tyre pressure gauge comprising a cylindrical housing having an open top, a tubular member having a first end secured to said housing and a second end, a first measuring head fixed to said second end and capable of being inserted upon an air valve of a type for passing therethrough an air pressure from said tyre into said tubular member, a piston rod received in said member for being axially actuated therein by said air pressure, a spiral spring mounted between said housing and said piston rod for restoring said rod into a position not actuated by said pressure, a sectorial plate pivotally mounted in said housing, capable of being pivoted by said rod and having an arcuate toothed edge, a restoring spring mounted between said housing and said sectorial plate for restoring said plate into a position not pivoted by said rod, a pinion rotatably mounted in said housing and meshing with said toothed edge, a scale plate covered on said open top, a needle connected to said pinion for pointing on said scale plate when said rod pivots said sectorial plate which in turn rotates said pinion, and a pawl mounted in said housing and capable of pawling said pinion in a position rotated by said sectorial plate, characterized in that said gauge further includes:
   a soft tube having a first end detachably connected to said first measuring head and a second end; and
   a second measuring head including:
   a hollow measuring rod having a third end connected to said second end of said soft tube and a fourth end having a central axial projection having an eccentrical axial through hole communicating with a hollow center of said measuring rod; and
   a cylindrical piece coaxially secured to said fourth end and capable of cooperating with said projection to form therebetween an annular space capable of inserting therein a top portion of said air valve.

2. A tyre pressure gauge according to claim 1, wherein said pawl is an elastic metal wire.

3. A tyre pressure gauge according to claim 1, further comprising a hollow connector having a first end detachably connected to said first measuring head and a second end connected to said first end of said soft tube.

4. A tyre pressure gauge according to claim 1, wherein:
   said first measuring head includes a circular diaphragm coaxially mounted in said second end of said tubular member and having an eccentrical through hole capable of passing therethrough said air pressure, and a second central axial projection extended from said diaphragm and capable of cooperating with a wall of said second tubular member end to form therebetween an annular space; and
   said second tubular member end, said circular diaphragm and
   said second projection are integrally formed.

5. A tyre pressure gauge acording to claim 1, further comprising a mounting block fixed to said housing, securing therein said first tubular member end, and protruding therefrom said piston rod in said housing.

* * * * *